United States Patent
Dressler

(10) Patent No.: US 6,786,607 B2
(45) Date of Patent: Sep. 7, 2004

(54) ARRANGEMENT FOR STORING AND TRANSPORTING AT LEAST ONE OPTICAL COMPONENT

(75) Inventor: Thomas Dressler, Jena (DE)

(73) Assignee: Jenoptik Laser, Optik, Systems GmbH, Jena (DE)

(*) Notice: Subject to any disclaimer, the term of this patent is extended or adjusted under 35 U.S.C. 154(b) by 29 days.

(21) Appl. No.: 10/321,170

(22) Filed: Dec. 17, 2002

(65) Prior Publication Data

US 2003/0156680 A1 Aug. 21, 2003

(30) Foreign Application Priority Data

Dec. 18, 2001 (DE) .......................................... 101 64 529

(51) Int. Cl.[7] .................................................. G02B 7/00
(52) U.S. Cl. ........................ 359/507; 359/508; 359/509; 359/510; 359/511; 359/512; 359/513
(58) Field of Search ................................. 359/507–513; 414/411–414, 806–808, 937–940

(56) References Cited

U.S. PATENT DOCUMENTS

| | | | |
|---|---|---|---|
| 5,984,610 A | 11/1999 | Rush et al. | 414/416 |
| 6,244,812 B1 * | 6/2001 | Patterson et al. | 414/416.01 |
| 6,283,692 B1 * | 9/2001 | Perlov et al. | 414/222.01 |
| 6,398,475 B1 * | 6/2002 | Ishikawa | 414/217 |

FOREIGN PATENT DOCUMENTS

| | | |
|---|---|---|
| DE | 692 01 146 T2 | 8/1995 |
| DE | 198 13 684 A1 | 9/1999 |
| EP | 0 735 573 A1 | 10/1996 |
| WO | WO 00 02228 A1 | 1/2000 |

OTHER PUBLICATIONS

English Abstract of DE 692 01 146 T2.
English Abstract of DE 198 13 684 A1.
English Abstract of EP 0 735 573 A1.

* cited by examiner

Primary Examiner—Mohammad Sikder
(74) Attorney, Agent, or Firm—Reed Smith LLP

(57) ABSTRACT

In an arrangement for storing and transporting at least one optical component, it is the object of the invention to protect the optical components from contamination not only during their storage and transport, but also when installing them in operative condition in the optical projection beam path so as to ensure their readiness for immediate operation. This object is met in that every optical component is fastened in an aligned manner to a carrier that is provided in a vessel, and a manipulator acts on the carrier to transfer the carrier into an optical beam path enclosed by a cleanroom through an airlock opening which is formed when the vessel door is open. The arrangement can be used particularly when optics must be stored and manipulated so as to be protected from environmental influences.

11 Claims, 3 Drawing Sheets

ARRANGEMENT FOR STORING AND TRANSPORTING AT LEAST ONE OPTICAL COMPONENT

CROSS-REFERENCE TO RELATED APPLICATION

This application claims priority of German Application No. 101 64 529.5, filed Dec. 18, 2001, the complete disclosure of which is hereby incorporated by reference.

BACKGROUND OF THE INVENTION a) Field of the Invention

The invention is directed to an arrangement for storing and transporting at least one optical component which is accommodated in a vessel with a vessel door which closes in a gastight manner for protection against environmental influences.

b) Description of the Related Art

It is well known that in optical lithography chip structures are transferred to a wafer by means of a mask and with light. While special lasers generate the wavelengths needed for high resolution, high-resolution projection objectives serve to image the structures, and the very high-resolution lenses contained therein are gaining importance due to increasingly smaller chip structures.

Lenses of optical glasses or quartz lasers are not suitable for the corresponding projection objectives primarily because of their low resistance to short-wave laser radiation. It is better to use lenses of high-quality calcium fluoride, although this is very susceptible to contamination, particularly by water. Even monolayers of water which are difficult to remove from the fluoride surfaces result in high absorption losses at laser wavelengths below 193 nm and particularly at 157 nm.

For this reason, the optical components in wafer steppers are surrounded by a cleanroom atmosphere in that the operation is carried out either with gas purging or under vacuum conditions.

The problem of protecting the surfaces of the optical components from impurities after their production until they are put into operation in the optical projection beam path has not been solved satisfactorily, particularly when closeable vessels are used for storage.

It is particularly problematic to maintain cleanliness when the components are to be stored initially and transferred into the projection beam path of the semiconductor fabrication plant subsequently while ensuring their readiness for immediate operation.

OBJECT AND SUMMARY OF THE INVENTION

Therefore, it is the primary object of the invention to solve this problem, particularly to protect the optical components from contamination not only during their storage and transport, but also when installing them in operative condition in the optical projection beam path.

This object is met in an arrangement of the type mentioned above in that every optical component is fastened in an aligned manner to a carrier that is provided in the vessel, a manipulator acts on the carrier to transfer the carrier into an optical beam path enclosed by a cleanroom through an airlock opening which is formed when the vessel door is open.

The vessel door is outfitted with drivers for a closure of a loading and unloading opening of a chamber enclosing the cleanroom, which drivers engage in the closure during assembly and when opening the vessel, so that the airlock opening is released when the vessel door is pulled open perpendicular to the direction of manipulation such that the closure is carried along.

The vessel door advantageously comprises two parts which are displaceable relative to one another; a first part contains the drivers and a second part which can be fastened serves to close the vessel. The two parts have opening distances which differ from one another and are displaceable into different positions in a direction perpendicular to the manipulation of the carrier.

In a first position, the first part opens the loading and unloading opening by carrying along the closure in order for protective gas to flow out of the chamber for partial cleaning, whereas the second part closes the vessel in the fastened state. The airlock opening is released in at least one further position.

In a particularly advantageous manner, in a second position in which the fastening of the second part is canceled, the two parts of the vessel door are initially moved into a common displacement position in which the loading and unloading opening is completely open and the vessel is partly open. Finally, due to the fact that its opening excursion is greater than that of the first part, the second part occupies another displacement position in a third position in which the vessel is also completely open. A partly automatic safety mechanism which acts vertical to the displacing position and mechanically locks the first part and second part relative to the vessel can be installed in the second part.

In order to prevent pressure losses within the chamber, it is particularly advantageous when the vessel is provided with a diaphragm for limiting a gap which is formed when the vessel is opened due to a wedge-shaped construction of the second part.

In order to transfer the carrier safely and quickly with every optical component fastened thereto in an aligned manner, the manipulator should be contained in the vessel and should have an interface for attaching a lengthening manipulator arm for long transport paths. During manipulation, the carrier can be fixed in various locking positions lying in different planes and is separated from the manipulator only in these locking positions.

By means of the invention, an optical component is transferred into an installation to be loaded while retaining a defined aligned state had by the optical component in a protective atmosphere, so that it can perform its imaging function within the installation without additional alignment. The component is constantly protected against contamination during storage and also when transferred from the vessel to a cleanroom. This minimizes the risk of handling for $CaF_2$ components.

Since the vessel is also suited for removal of the optical components from the installation, the cost-intensive optical components can be transported for further processing in this manner. The optical surfaces that are loaded by laser radiation can be re-polished and re-coated in the above-mentioned processing. The optical components that have been treated in this way are then put into the vessel again in the pre-aligned state in order to protect them from environmental influences so that, if necessary, they are available for use in one of the beam paths of an installation.

Another advantage consists in that the preadjusted components can be handled quickly and easily without stopping the system. The vessel can be connected to the installation in question in a simple manner.

The invention will be described more fully in the following with reference to the schematic drawings.

DESCRIPTION OF THE PREFERRED EMBODIMENTS

Figure 1:
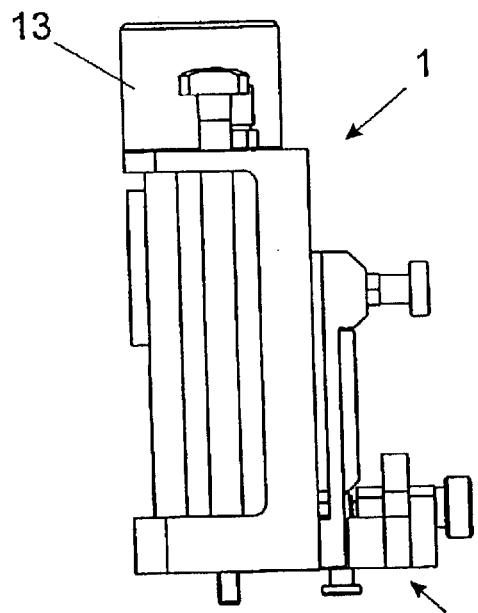
FIG. 1 shows a side view of a closed transport vessel.

A vessel 1, shown in FIGS. 1 and 2 and 6 to 11, which serves to store and transport optical components and to protect them from environmental influences is outfitted with an airlock system for transferring the optical components into an optical beam path. A vessel door 2 which serves to close the vessel 1 in a gastight manner is a component part of the airlock system and comprises two parts 3 and 4 which are displaceable relative to one another. Stops 5 and 6 at part 4, which comprises the actual closing member, limit a first relative displacement of the first part 3 with respect to the second part 4. While both parts 3 and 4 are initially displaceable jointly through a linear guiding of part 4 in a sliding guide of the vessel 1 up to a first predetermined excursion length, part 4 additionally has an extended excursion. Both the vessel 1 and the vessel door 2 are made of materials or are provided with coatings which prevent gas evolution of unwanted elements. Suitable materials are, for example, high-quality steel in which the sulfur content is very small or materials that can be coated with nickel phosphorous.

The closing part 4 is advantageously wedge-shaped, so that the vessel door 2 can be closed in a space-saving manner by a sliding mechanism so as to be tight against dust and, when screwed down, also vacuum-tight. Required seals are arranged circumferentially in a trapezoid groove in such a way that they can not fall off and these seals engage against the diagonal surface 8 of part 4 in the closed state of the vessel 1.

Drivers 9, 10 at part 3 are provided for opening and closing a closure 11 of a loading and unloading opening 12 to a cleanroom, not shown, in which the optical beam path is located.

The vessel 1 which is protected by a removable cover cap 13 which can also be provided with connections for protective gas for purposes of purging contains a manipulator 14. In defined positions of a carrier 15 for at least one optical component 16 that is fastened thereto in an aligned manner, the manipulator 14 engages at the carrier 15 in a detachable manner. Optical components 16 of this type can be, for example, specially cleaned cylindrical lenses, spherical lenses, optical entrance and exit windows or plane optics such as mirrors.

A transport securing arrangement which is formed with a springing pushing member 17 fixates the manipulator 14 during the transport and storage of the vessel 1 and also prevents the cover cap 13 from being attached in that it projects over the attachment area until the manipulator 14 is stopped again.

Figure 4:
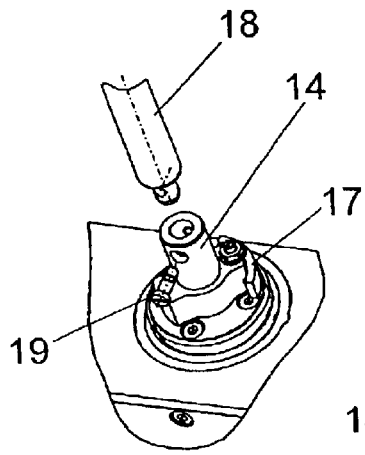
FIG. 4 shows the interface for fastening the lengthening manipulator arm.
Figure 5:
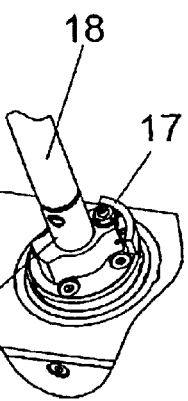
FIG. 5 shows an unlocking mechanism for the manipulator.
Figure 2:
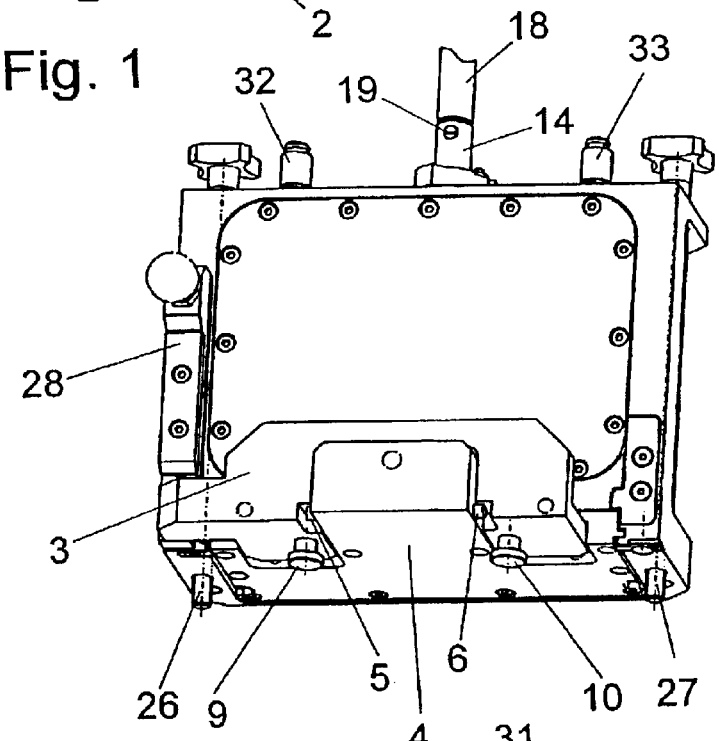
FIG. 2 shows the closed transport vessel in a perspective view.

The manipulator 14 has an interface in the form of a screw connection 19 (FIG. 4) for fastening a lengthening manipulator arm 18. In order to handle the carrier 15 with each optical component 16 fastened thereto, it is necessary to release the position securing device 17 corresponding to the view in FIG. 5 by means of axial displacement in order to bring about the displaceability of the manipulator 14 which is directed perpendicular to the displacement of the vessel door 2.

Figure 3:
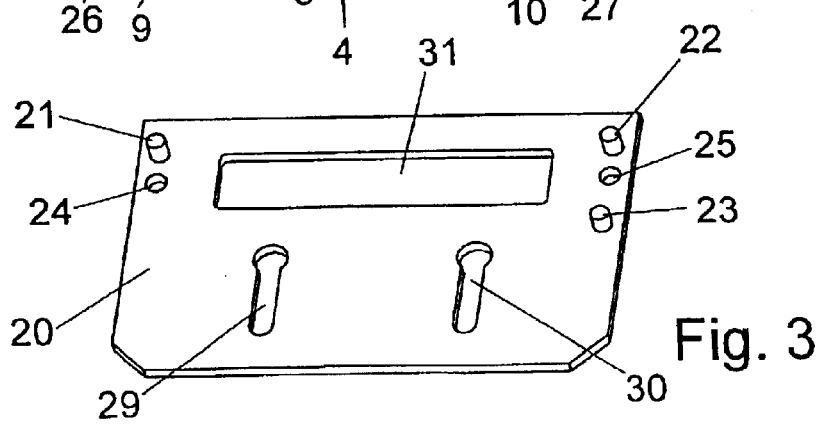
FIG. 3 shows a holding plate serving as an interface for the transport vessel.
Figure 6:
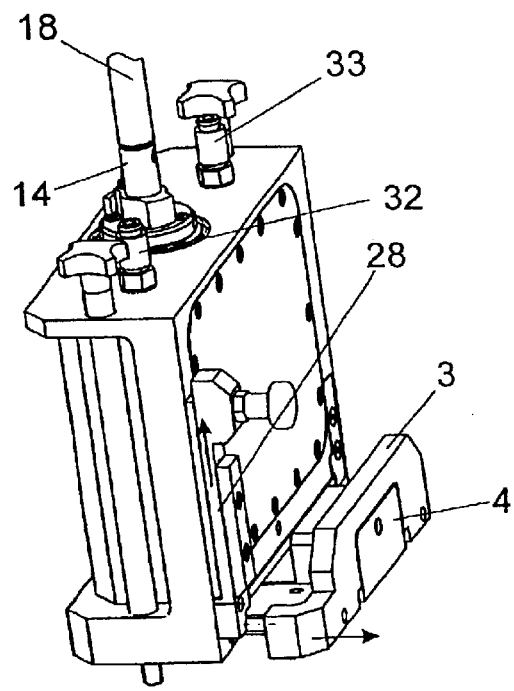
FIG. 6 shows the partly opened transport vessel in a perspective side view.
Figure 7:
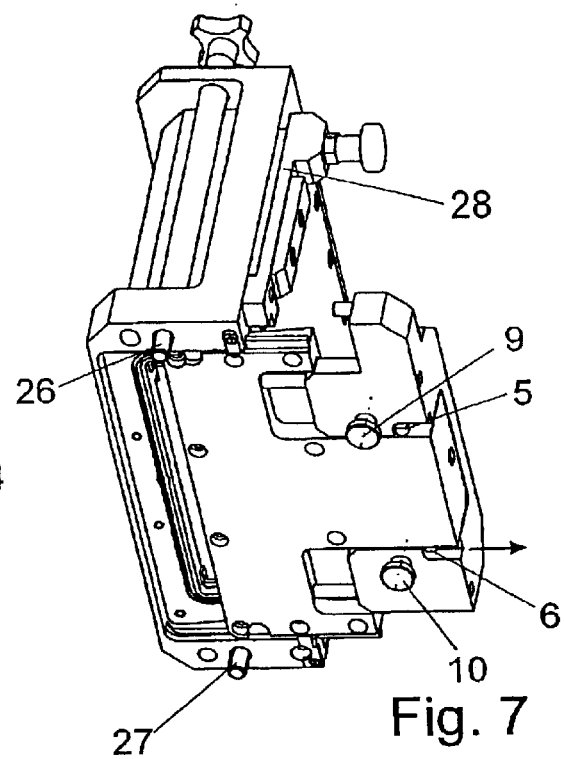
FIG. 7 shows the partly open transport vessel from FIG. 6 in a perspective bottom view.

In order to put this displaceability into action in a useful manner, a holding plate 20 which serves as an interface is arranged in the area of the loading and unloading opening 12 for the vessel 1 and, as shown in FIG. 3, contains pins 21, 22 and 23 for arranging the vessel 1 so as to be oriented in position, as well as threaded bore holes 24, 25 into which spindles 26, 27 which are inserted through the vessel 1 in a nondetachable manner can be screwed so as to fasten the vessel 1. Pin 23 also has another function in that it serves as a fastening element for releasing a locking slide 28 which secures the closing part 4 of the vessel door 2 when the vessel 1 is not placed on the holding plate 20 or when the vessel door 2 is to be opened outside of the system.

The drivers 9 and 10 can be guided through longitudinal grooves 29, 30 so that they can engage in the closure 11 for opening the latter. When the vessel 1 is placed on the holding plate 20 and the closure 11 is opened (FIG. 10), the transport path for the carrier 15 to be manipulated and every optical component 16 located on the carrier 15 is accordingly opened to the optical beam path in the cleanroom via a through-window 31 in the holding plate 20 and the loading and unloading opening 12.

Further, the vessel 2 has connections 32, 33 through which unwanted substances can be removed by purging with protective gas (nitrogen) or by evacuation. These steps are advantageously carried out in an alternating manner.

Figure 10:
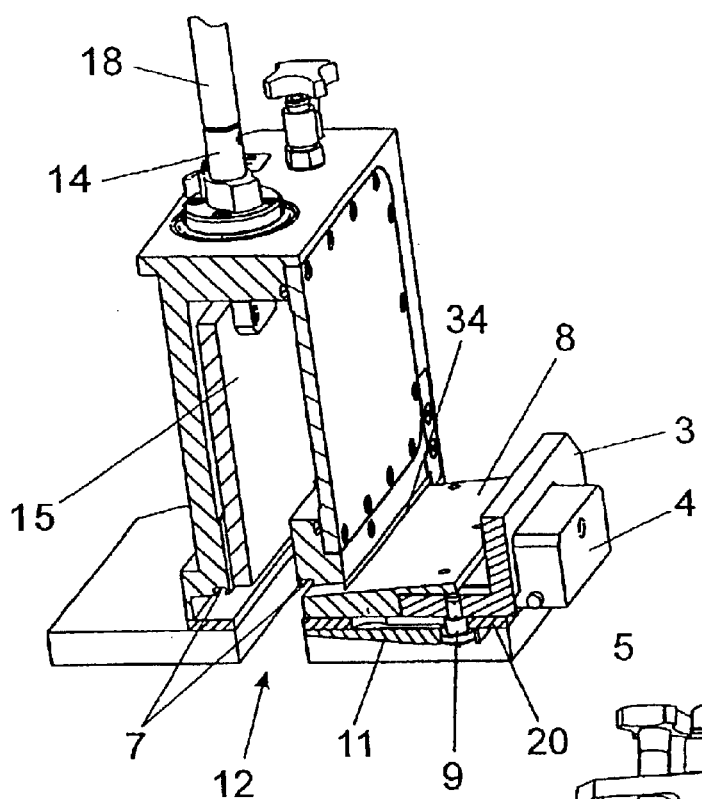
FIG. 10 shows a section through the completely open transport vessel with the closure, open at the same time, for a loading and unloading opening of a cleanroom.
Figure 11:
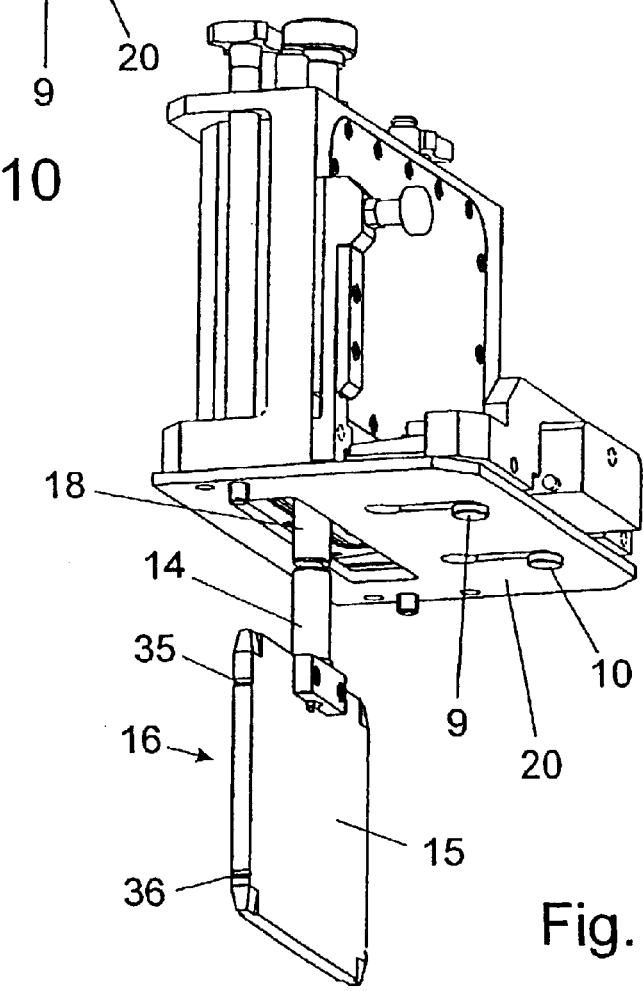
FIG. 11 shows the completely open transport vessel with extended optics carrier.

In order to transfer the carrier 15 located in the vessel 1 into the optical beam path with every optical component 16 fastened thereto in an aligned manner, the vessel 1 is placed on the holding plate 20 and screwed on by the spindles 26, 27. In this process, the drivers 9, 10 engage at the part 3 through the longitudinal grooves 29, 30 in the holding plate 20 in the closure 11 of the loading and unloading opening 12 which is constructed as an airlock gate (FIG. 10).

By pulling the first part 3 of the vessel door 2 by about 10 mm until it contacts the stops 5, 6 of the second part 4, the closure 11 is carried along and opens the loading and unloading opening 12 in the cleanroom far enough so that an exiting flow of protective gas can clean the loosely contacting parts 3, 4 of the vessel door 2, holding plate 20 and closure 11.

After the purging process during which the vessel 1 is still closed by the second part 4 of the vessel door 2, the locking slide 28 which is released by means of the pin 23 can be actuated so that the second part 4 can now also be carried along as the first part 3 is pulled open further and the vessel 1 is opened.

Figure 8:
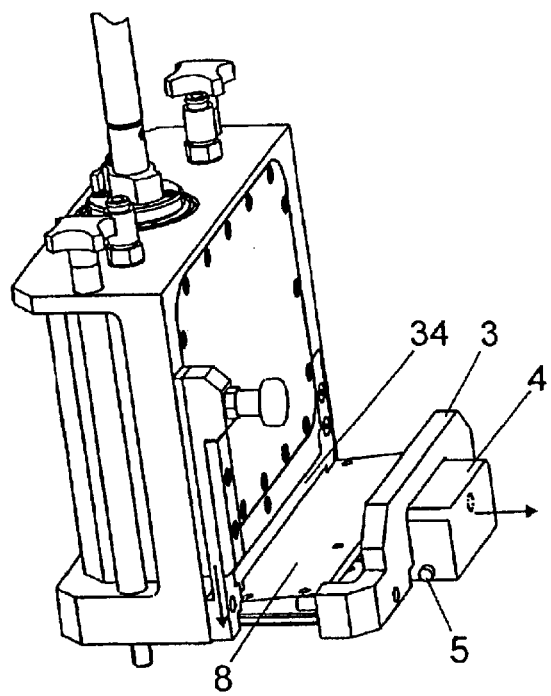
FIG. 8 shows the completely open transport vessel in a perspective side view.
Figure 9:
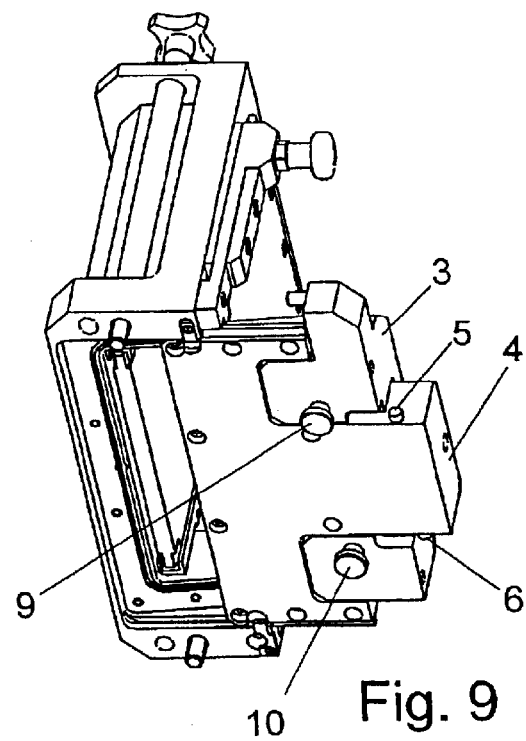
FIG. 9 shows the completely open transport vessel from FIG. 8 in a perspective bottom view.

In the present construction, the different excursions of the closure 11 and vessel door 2 are advantageously compensated in that the second part 4 of the vessel door 2 has an extended excursion compared to the first part. The second part 4 can accordingly continue to be pulled open after the first part 3 has reached its final position due to the stopping of the drivers 9, 10 in the longitudinal grooves 29, 30 of the holding plate 20 (FIGS. 8 and 9).

In order to prevent pressure losses inside the cleanroom, the vessel 1 is advantageously provided in the door area with a gap limiting device in the form of a diaphragm 34 which always leaves open a substantially constant gap of about $\frac{1}{10}$ mm to $\frac{2}{10}$ mm relative to the diagonal surface 8 of the wedge-shaped closing part 4. The diaphragm 34 is a springing sliding piece whose outside areas rest on the diagonal surface 8 as line guides and which leaves open the substantially constant gap by means of a cutout provided between the line guides. Scratching of the diagonal surface is prevented in that the line guide is carried out on a sliding surface outside of the sealing area.

When the vessel 1 and the loading and unloading opening 12 are completely open, the carrier 15 with every optical component 16 fastened thereto in an aligned manner can be transferred into the optical beam path by means of the manipulator 14 and can be permanently positioned and fixed in a work position after removing the cover cap 13, screwing down the lengthening manipulator arm 18 and releasing the transport securing device 17.

Owing to the fact that every optical component 16 is pre-aligned on the carrier 15, the objects that are transferred into the optical beam path are ready for immediate operation. Accordingly, the transferred object need only be placed against reference points in order to produce this desired state. These reference points can be shaped differently depending on the type of optical component.

In order to prevent the manipulator 14 from falling through and, therefore, in order to prevent loss of the optical component 16, grooves 35, 36 are incorporated in the carrier 15, and springing push pins which are located inside the vessel 1 and inside the cleanroom can lock into these grooves 35, 36 in order to adjust different lock-in positions lying in different planes. The manipulator 14 can be separated from the carrier 15 only in these lock-in positions in that a screw connection is to be released only when the carrier 15 is fixed by means of this locking in.

The manipulator 14 which is advantageously integrated in the vessel 1 in this construction can also be arranged outside the vessel 1 in another construction as an external handling arrangement.

After the manipulator 14 is separated from the carrier 15 and has been returned to the vessel 1, the vessel 1 is closed and is separated from the holding plate 20 in reverse of the sequence for attaching and opening.

While the foregoing description and drawings represent the present invention, it will be obvious to those skilled in the art that various changes may be made therein without departing from the true spirit and scope of the present invention.

What is claimed is:

1. An arrangement for storing and transporting at least one optical component which is accommodated in a vessel with a vessel door closing in a gastight manner for protection against environmental influences, comprising:

a vessel having a vessel door which closes in an airtight manner;

a carrier provided in the vessel to which every optical component is fastened in an aligned manner;

a cleanroom having an airlock opening; and a manipulator acting on the carrier to transfer the carrier into an optical beam path enclosed by said cleanroom through said airlock opening which is formed when the vessel door is open.

2. The arrangement according to claim 1, wherein the vessel door has drivers for a closure of a loading and unloading opening of a chamber enclosing the cleanroom, which drivers engage in the closure when opening the vessel, so that the airlock opening is released when the vessel door is pulled open perpendicular to the direction of manipulation such that the closure is carried along.

3. The arrangement according to claim 2, wherein the vessel door comprises two parts which are displaceable relative to one another, a first part which contains the drivers and a second part which can be fastened and serves to close the vessel.

4. The arrangement according to claim 3, wherein the two parts have opening distances which differ from one another.

5. The arrangement according to claim 4, wherein the two parts are displaceable into different positions in a direction perpendicular to the manipulation of the carrier, wherein, in a first position, the first part opens the loading and unloading opening by carrying along the closure in order for protective gas to flow out of the chamber for partial cleaning, whereas the second part closes the vessel in the fastened state, and wherein the airlock opening is released in at least one further position.

6. The arrangement according to claim 5, wherein, in a second position in which the fastening of the second part is canceled, the two parts are moved into a common displacement position in which the loading and unloading opening is completely open and the vessel is partly open, and wherein, in a third position, the second part is moved into another displacement position in which the vessel is also completely open due to the fact that the second part opens further than the first part.

7. The arrangement according to claim 6, wherein in order to prevent pressure losses within the chamber, the vessel is provided with a diaphragm for limiting a gap which is formed when the vessel is opened due to a wedge-shaped construction of the second part.

8. The arrangement according to claim 1, wherein the vessel contains the manipulator for transferring the carrier jointly with every optical component which is fastened thereto in an aligned manner.

9. The arrangement according to claim 8, wherein the manipulator has an interface for fastening a lengthening manipulator arm.

10. The arrangement according to claim 9, wherein the carrier can be fixed in lock-in positions lying in different planes during manipulation.

11. The arrangement according to claim 10, wherein the manipulator can be separated from the carrier only in the lock-in positions.

* * * * *